(No Model.) C. R. BONNETT. 2 Sheets—Sheet 1.
SHELF FOR BAKING OVENS.

No. 557,759. Patented Apr. 7, 1896.

Witnesses
Chas. J. Farrar.
Robt. C. Totten.

Inventor
Clarence R. Bonnett
By Hay & Totten
Attorneys.

(No Model.)  2 Sheets—Sheet 2.

C. R. BONNETT.
SHELF FOR BAKING OVENS.

No. 557,759. Patented Apr. 7, 1896.

Witnesses.
Chas. J. Farrar.
Robt. C. Totten

Inventor.
Clarence R. Bonnett
By Kay & Totten
Attorneys.

UNITED STATES PATENT OFFICE.

CLARENCE R. BONNETT, OF ALLEGHENY, PENNSYLVANIA, ASSIGNOR OF ONE-HALF TO WALTER R. MARVIN, OF PITTSBURG, PENNSYLVANIA.

SHELF FOR BAKING-OVENS.

SPECIFICATION forming part of Letters Patent No. 557,759, dated April 7, 1896.

Application filed July 19, 1895. Serial No. 556,439. (No model.)

*To all whom it may concern:*

Be it known that I, CLARENCE R. BONNETT, a resident of Allegheny, in the county of Allegheny and State of Pennsylvania, have invented a new and useful Improvement in Shelves for Baking-Ovens; and I do hereby declare the following to be a full, clear, and exact description thereof.

My invention relates to the baking of crackers, cakes, bread, &c., its object being to provide for the baking of the same evenly throughout and in so doing to improve the quality thereof and to provide for the more rapid baking and the saving of fuel.

My invention comprises, generally stated, an oven having a reel mounted therein, permanent flat perforated shelves on said reel to provide for peeling, and a source of radiant heat situated contiguous to the path of said perforated shelves, so that heat may pass through the perforations of the shelves and heat the shelves and enter the articles of food resting thereon.

To enable others skilled in the art to use my invention, I will describe the same more fully, referring to the accompanying drawings, in which—

Figure 1:
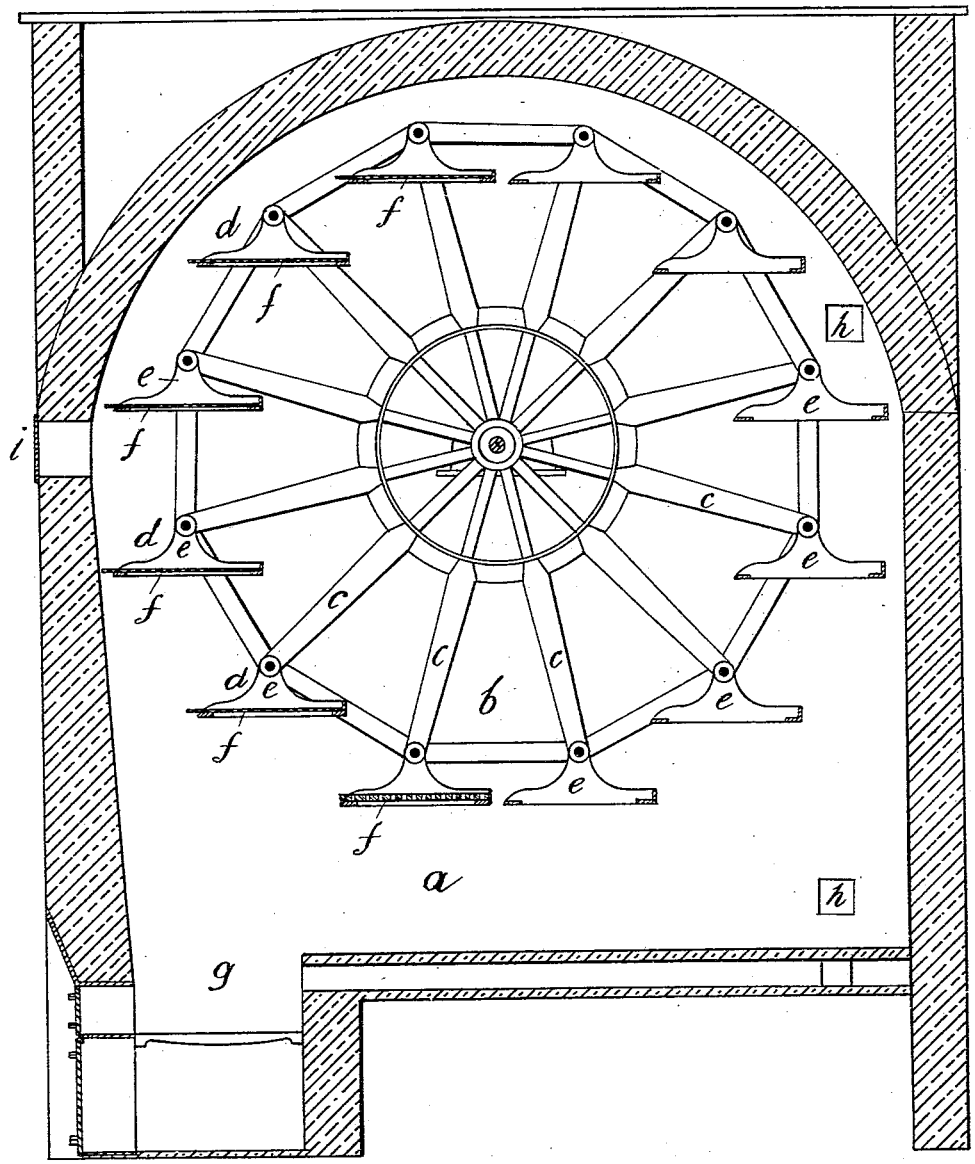
Figure 2:
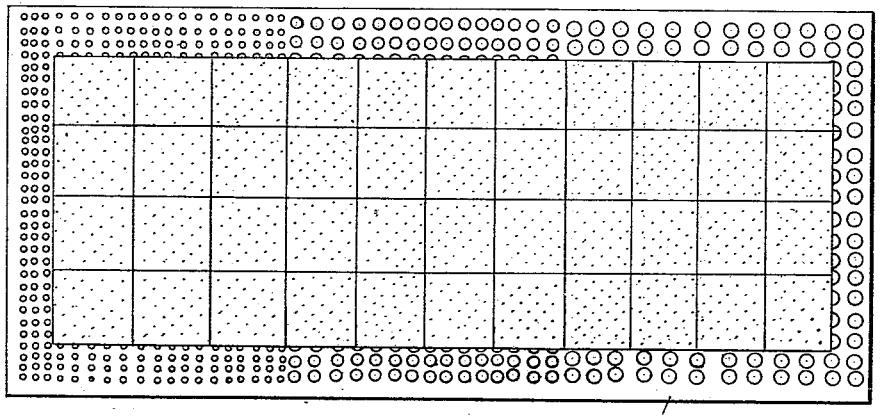
Figure 3:
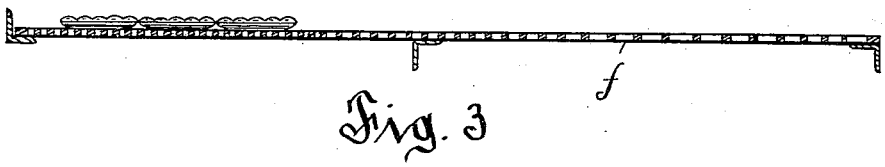
Figure 4:
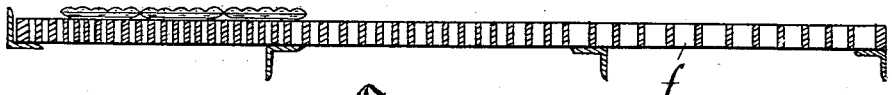

Figure 1 is a vertical section of a reel-oven embodying my invention. Fig. 2 is a top view of the shelf-bottom. Fig. 3 is a cross-section of a portion of the shelf, showing the crackers thereon; and Fig. 4 is a sectional view of a shelf-bottom formed of perforated tile.

Like letters indicate like parts in each of the figures.

The oven $a$ has an arched top and has the reel $b$ mounted therein. From the arm $c$ on said reel $b$ hang the shelves $d$, said shelves being composed of the skeleton frame $e$ and the plates $f$, resting thereon and forming the shelf-bottom. These plates $f$ are provided with numerous perforations extending through the same, the size and number of perforations depending upon the stiffness of the dough from which the crackers and cakes are formed, it only being necessary that the perforations shall not be so large as to permit the dough supported on the shelves to drop into them to such an extent as to mar the under surface or the proper shape of the crackers, cakes, &c., being baked or prevent the easy peeling of them from the shelves. The perforations may be of any desired shape and may be of peculiar designs, into which the dough will descend for a slight distance, so that while the shelves support the crackers these designs will be reproduced on the lower faces of the crackers. Where the dough is stiff, the perforations may be increased in size and a smaller number used; but where it is apparently soft it is necessary to reduce the size and increase the number of these perforations. The plate illustrated in Fig. 2 shows different sizes of perforations to make this clear. These plates can be formed either of plate or sheet metal of suitable thickness, or of soapstone, slate, tile, or other material suitable for the purpose. They have a smooth upper surface, providing for the peeling of the crackers, cakes, &c., onto or from this shelf, which is a practical necessity for any permanent oven-shelves onto which the crackers are introduced and withdrawn by peeling.

When I speak of the shelves as being "permanent," I mean that the shelves remain on the reel in the regular operation of the oven, the crackers being peeled onto and off the shelves, said shelves being always exposed to the heat of the oven, though they may be removed or changed, if desired.

The shelf-bottom can be formed in section, and when formed of plate metal it is only necessary to employ sections extending entirely across the shelf, and the plates can be cast to shape and can be punched or perforated by any suitable machine. The same is also the case with soapstone or slate; but where tile shelves are employed they must be made in smaller sections and perforated before being baked. Such shelf-bottom formed of tile is shown in Fig. 4. The oven $a$ has the furnace $g$, provided with the grate-bars and suitable doors leading thereto for charging and cleaning same, said furnace being in direct communication with the chamber containing the reel, so that as said reel revolves the shelves are acted upon directly by the heat, while at the same time the arched top of the oven radiates the heat down upon the shelves, so that the articles to be cooked are subjected to heat on all sides. The oven is provided with the door $i$ and the outlets $h$.

In the baking operation one of the shelves is brought opposite to the oven-door and the crackers, cakes, &c., are placed thereon in the usual way. The operator passes the peel under the crackers on the cracker-machine, carrying them to the oven and sliding the peel over the surface of the shelf-bottom and then withdrawing it, leaving the crackers upon the shelf. After the crackers are baked he removes them in the same way, the smooth surface of the shelf-bottom providing for this operation in the same way as the solid shelf. When the crackers are exposed to the heat of the oven, the heated gases or air passes upwardly through the perforated shelves and therefore acts directly upon the crackers, so that their lower faces are exposed practically as fully to the heat as their upper surfaces, and in addition to this, on account of the entrance of the heated gas within the perforations, the shelf-bottoms themselves are more evenly heated and are maintained at a higher temperature, so that any heat absorbed by the shelves is again absorbed by the crackers from the shelves on account of the passage of the heated gases into or through the perforations. It is found that on account of the action of the heat directly from the furnace and also the radiated heat from the oven the crackers can be more evenly and rapidly baked and that the lower surfaces can be baked and colored to the same extent as the upper surfaces, thus very materially improving the appearance and quality of the crackers. The most important advantage obtained, however, is that the cracker or cake, on account of the different method of applying the heat, is rendered more crisp and more palatable, and a very decided difference in the flavor or taste of the cracker is obtained in this way, which is apparent in crackers formed from the same dough baked at the same time in the same oven on the solid shelf and the perforated shelf, respectively.

It is also found that the oven may be operated more rapidly and a quicker baking action obtained, or else the oven may be run at a lower temperature. In either case a considerable saving in fuel is obtained in proportion to the amount of crackers baked.

What I claim as my invention, and desire to secure by Letters Patent, is—

The combination with an oven having a reel therein, of permanent flat perforated shelves on said reel to provide for peeling, and a source of radiant heat situated contiguous to the path of said perforated shelves so that heat may pass up through the perforations of the shelves and heat said shelves and enter the articles of food resting thereon, substantially as set forth.

In testimony whereof I, the said CLARENCE R. BONNETT, have hereunto set my hand.

CLARENCE R. BONNETT.

Witnesses:
JAMES H. KAY,
ROBERT C. TOTTEN.